US012534567B2

(12) United States Patent
Inoue et al.

(10) Patent No.: US 12,534,567 B2
(45) Date of Patent: Jan. 27, 2026

(54) POLYHYDROXYALKANOIC ACID AND METHOD FOR PRODUCING SAME

(71) Applicant: FUENCE CO., LTD., Tokyo (JP)

(72) Inventors: Kozo Inoue, Tokyo (JP); K Sudesh Kumar C Kanapathi Pillai, Penang (MY)

(73) Assignee: FUENCE CO., LTD., Tokyo (JP)

( * ) Notice: Subject to any disclaimer, the term of this patent is extended or adjusted under 35 U.S.C. 154(b) by 817 days.

(21) Appl. No.: 17/606,021

(22) PCT Filed: Apr. 24, 2020

(86) PCT No.: PCT/JP2020/017811
§ 371 (c)(1),
(2) Date: Oct. 23, 2021

(87) PCT Pub. No.: WO2020/218565
PCT Pub. Date: Oct. 29, 2020

(65) Prior Publication Data
US 2023/0312814 A1    Oct. 5, 2023

(30) Foreign Application Priority Data

Apr. 26, 2019 (JP) .................. 2019-086889

(51) Int. Cl.
C08G 63/06 (2006.01)
C12N 15/74 (2006.01)
(Continued)

(52) U.S. Cl.
CPC ............. C08G 63/06 (2013.01); C12N 15/74 (2013.01); C12P 7/625 (2013.01); C12P 7/62 (2013.01)

(58) Field of Classification Search
CPC ............. C08G 63/06; C12P 7/625; C12P 7/62
See application file for complete search history.

(56) References Cited

U.S. PATENT DOCUMENTS 5,981,257 A    11/1999  Fukui et al.
2003/0087234 A1  5/2003  Heumann
(Continued)

FOREIGN PATENT DOCUMENTS

EP    1626087 A1    2/2006
EP    2295536 A1    3/2011
(Continued)

OTHER PUBLICATIONS

Budde et al. (Production of Poly(3-Hydroxybutyrate-co-3-Hydroxyhexanoate) from Plant Oil by Engineered *Ralstonia eutropha* Strains), Applied and Environmental Microbiology, 2011, 77 (9), p. 2847-2854. (Year: 2011).*

(Continued)

Primary Examiner — Marc S Zimmer
Assistant Examiner — Surbhi M Du
(74) Attorney, Agent, or Firm — IMAIZUMI IP LAW, PLLC; Toshikatsu Imaizumi

(57) ABSTRACT

It is an object of the present invention to provide a polyhydroxyalkanoate P(3HB-co-3HHx) comprising 3-hydroxybutanoate and 3-hydroxyhexanoate, the polyhydroxyalkanoate having high melt fluidity and excellent processability.
In order to solve the problems described above, the inventors of the present invention found that with regard to a polyhydroxyalkanoate comprising 3-hydroxybutanoate and 3-hydroxyhexanoate, when the polyhydroxyalkanoate is produced by using microorganisms, and thereby the content of 3-hydroxyhexanoate is increased, a polyhydroxyalkanoate having novel physical properties is obtained. That is, the present invention provides the following polyhydroxyalkanoate, a molded body thereof, and a method for producing the polyhydroxyalkanoate. The polyhydroxyalkanoate of the present invention is a polyhydroxyalkanoate comprising a 3-hydroxybutanoate unit and a 3-hydroxyhexanoate unit, the (Continued)

polyhydroxyalkanoate having a melt flow rate at 160° C. and 2.16 kg/f of 2.5 g/10 minutes or more.

11 Claims, 3 Drawing Sheets

Specification includes a Sequence Listing.

(51) Int. Cl.
    *C12P 7/62*           (2022.01)
    *C12P 7/625*         (2022.01)

(56) References Cited

U.S. PATENT DOCUMENTS

| | | | |
|---|---|---|---|
| 2007/0087421 A1* | 4/2007 | Okubo | C12N 9/1025 435/197 |
| 2011/0091948 A1 | 4/2011 | Murakami et al. | |
| 2013/0071892 A1 | 3/2013 | Fukui et al. | |
| 2017/0218411 A1 | 8/2017 | Fukui et al. | |

FOREIGN PATENT DOCUMENTS

| | | | |
|---|---|---|---|
| EP | 3187590 A1 | 7/2017 | |
| JP | H09-508423 A | 8/1997 | |
| JP | H10-108682 A | 4/1998 | |
| JP | 2002-523073 A | 7/2002 | |
| JP | 2002-534981 A | 10/2002 | |
| JP | 2006-045366 A | 2/2006 | |
| JP | 2013-510572 A | 3/2013 | |
| JP | 2014-144553 A | 8/2014 | |
| JP | 2015-77103 A | 4/2015 | |
| KR | 10-1720933 B1 | 3/2017 | |
| WO | 95/20614 A1 | 8/1995 | |
| WO | 00/43523 A2 | 7/2000 | |
| WO | 2004/101796 A1 | 11/2004 | |
| WO | 2005/098001 A1 | 10/2005 | |
| WO | 2009/145164 A | 12/2009 | |
| WO | 2009/145164 A1 | 12/2009 | |
| WO | 2011/060048 A2 | 5/2011 | |
| WO | 2011/105379 A1 | 9/2011 | |
| WO | 2016/021604 A1 | 2/2016 | |
| WO | 2017/195732 A | 11/2017 | |
| WO | 2017/195732 A1 | 11/2017 | |

OTHER PUBLICATIONS

WIPO, International Search Report for International Application No. International Application No. PCT/JP2020/017811, Jun. 28, 2020.

WIPO, Written Opinion for International Application No. PCT/JP2020/017811, Jun. 28, 2020.

Fukui, Toshiaki et al., "Cloning and Analysis of the Poly(3-Hydroxybutyrate-co-B-Hydroxyhexanoate) Biosynthesis Genes of Aeromonas caviae", Journal of Bacteriology, 1997, vol. 179, No. 15, pp. 4821-4830 in particular, abstract, tables 2-4, p. 4821, left column, line 1 to right column, line 2.

Foong, Choon Pin et al., "A novel and wide Y substrate specific polyhydroxyalkanoate (PHA) synthase from unculturable bacteria found in mangrove soil", Journal of Polymer Research, 2018, vol. 25, Article No. 23, pp. 1-9 in particular, abstract, table 3, p. 1, right column, line 1 to last line.

Database GenBank [online], Accesion No. MF431721.1, <https://www.ncbi.nlm.nih.gov/nuccore/I423452969>, Jul. 17, 2018 uploaded, [retrived on Jul. 16, 2020], Uncultured bacterium poly(R)-hydroxyalkanoic acid synthase gene, complete cds in particular, sequence.

Murugan, Paramasivam et al., "A new biological recovery approach for PHA using mealworm, Tenebrio molitor", Journal of Biotechnology, 2016, vol. 239, pp. 98-105 in particular, abstract, p. 99, left column, section 2.1, fig. 3 (Cited in International Search Report and Written Opinion for International Application No. PCT/JP2020/017811: Cite Nos. 1 and 2 of Non-Patent Literature Documents in this list, and Cited in Japanese Office Action for Japanese Patent Application No. 2021-516295: Non-Patent Literature Documents in this list).

Japan Patent Office, Office Action for Japanese Patent Application No. 2021-516295, Aug. 17, 2021.

Japan Patent Office, Office Action for Japanese Patent Application No. 2021-516295, Nov. 2, 2021.

Applied and Environmental Microbiology, 2011, 77,9, 2847-2854 (Cited in Japanese Office Action for Japanese Patent Application No. 2021-516295: Non-Patent Literature Documents in this list).

Appl MicroBiol Biotehcnol, 2014, 98, 5461-5469 (Cited in Japanese Office Action for Japanese Patent Application No. 2021-516295: Non-Patent Literature Documents in this list).

European Patent Office, Extended European Search Report for European Patent Application No. 20795017.1, Jan. 10, 2023.

Japan Patent Office, Office Action for Japanese Office Action for Japanese Patent Application No. 2022-066682, Oct. 16, 2023 (a machine translation is attached hereto).

Korean Intellectual Property Office, Office Action for Korean Patent Application No. 10-2021-7038541, Apr. 18, 2025.

Korean Intellectual Property Office, Foong. C. P. et al., poly(R)-hydroxyalkanoic acid synthase [uncultured bacterium], GenBank, AXB72506.1, School of Biological Sciences, Universiti Sains Malaysia, USM, Apr. 18, 2025 (Cited in Korean Office Action for Korean Patent Application No. 10-2021-7038541 (Non-Patent Literature Documents in this list)).

\* cited by examiner

Fig.1

(SEQ No.1)

MASKDSFGKTGDLWSSMFNWMSGTMTAAAQIQQANMRAFAQSMELATSAYARMWGQPVEQVVPA
DRRFKDEAWTENMAADLLKQSYLITSQLMEIADGWGAIDPDLHERTRFWTQGLVDATSPANFAMTNP
VVMQEIARTGGMNLIQGAQNLLKDAQSGRLTQVPEDAFEVGKDLAITPGKVVYRNRLELIGYTPATET
VHEIPILVVPPWINKYYVMDMQPENSLFKYLVDAGFLFTISWKNPDETVLDLEWDDYLDLGTLEALRM
VKEIMGVEQVNLVGYCLGIISQVTLAYLAATGDDAQINSATYFTTHQDFSDAGEISVFISRLDVMFLEM
KISGGYLDGRNLAATFNMLRANDLLWNYVVHNYLLGQEPASFDLLYWNNDGTRVPGKVHSFLLREFF
LDNKLKEPEGIQVKGVGIDLGKITTPTVVTADRDHIVPWRGAFLVRQLQSGPVRFILSGGGHIAGVISPP
TKNRGFWINEEEKDDADAWLAGATKHDGSWWVDWIPWLEERSGRRVKPPTAAGSDEFKPLMDAPGT
YVLEK

Fig.2

(SEQ No.2)

MPIDARAALAAAPRRAEIAWNHKDVQLYHLGLGAGIPATDPDELRYTLESRLQVLPSFATVAGAGTAA
FGGMGADGIDVDLAAVLHGGQSVRVHRPIPVTGRAVQTSKVAAVYDKGKAAVIVLRTEAHDDEGPL
WTNDAQIFVRGEGGFGGERGPADRLALPDRAPDRTAERPIREDQALLYRLSGDWNPLHADPAFAKLA
GFDRPILHGLCTYGMVLKAVTDTLLDGDVSRIAAYRTRFAGVVFPGETLRIRMWQVGDGRVQVAVTA
AGRDDAPVLADTLVEHS

Fig.3

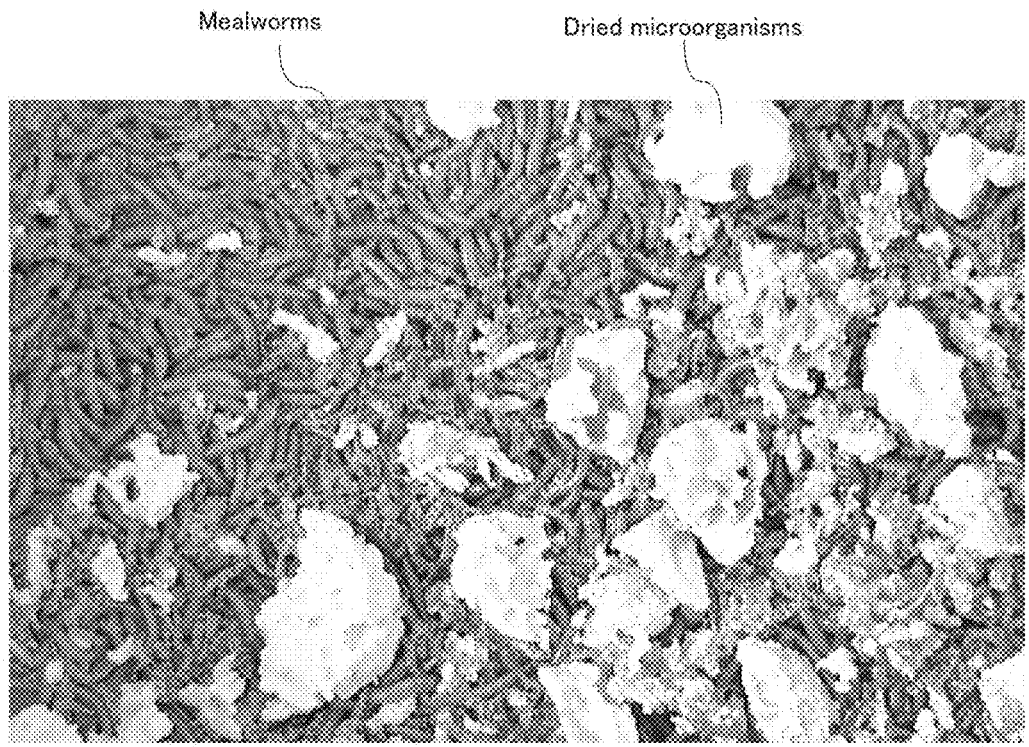

Fig.6
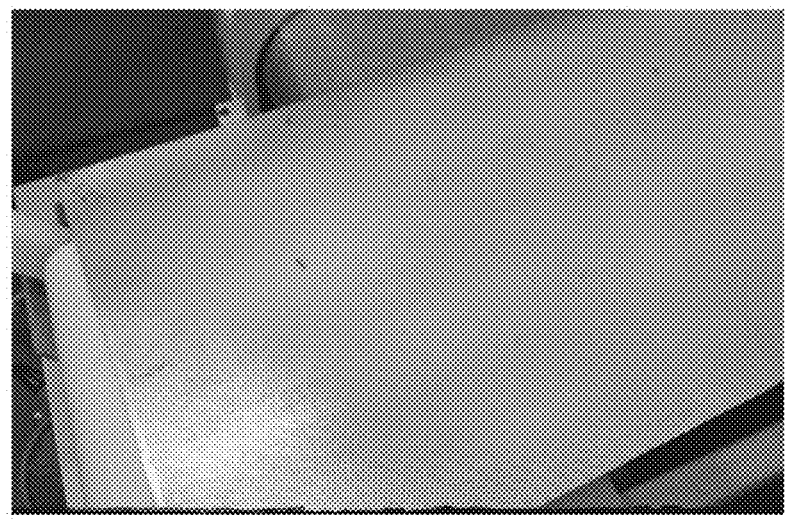
(A)
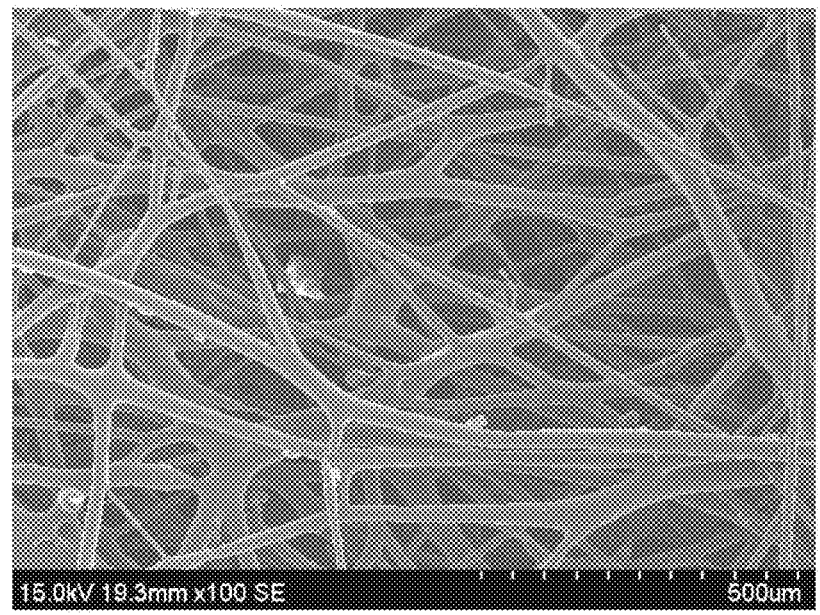
(B)

SEQUENCE LISTING

<160> NUMBER OF SEQ ID NOS: 2

<210> SEQ ID NO 1
<211> LENGTH: 544
<212> TYPE: PRT
<213> ORGANISM: unknown
<220> FEATURE:
<223> OTHER INFORMATION: Uncultured bacterium

<400> SEQUENCE: 1

Met Ala Ser Lys Asp Ser Phe Gly Lys Thr Gly Asp Leu Trp Ser Ser

-continued

```
1               5                   10                  15
Met Phe Asn Trp Met Ser Gly Thr Met Thr Ala Ala Ala Gln Ile Gln
                20                  25                  30
Gln Ala Asn Met Arg Ala Phe Ala Gln Ser Met Glu Leu Ala Thr Ser
                35                  40                  45
Ala Tyr Ala Arg Met Trp Gly Gln Pro Val Glu Gln Val Val Pro Ala
    50                  55                  60
Asp Arg Arg Phe Lys Asp Glu Ala Trp Thr Glu Asn Met Ala Ala Asp
65                  70                  75                  80
Leu Leu Lys Gln Ser Tyr Leu Ile Thr Ser Gln Leu Met Glu Ile Ala
                85                  90                  95
Asp Gly Trp Gln Ala Ile Asp Pro Asp Leu His Glu Arg Thr Arg Phe
                100                 105                 110
Trp Thr Gln Gln Leu Val Asp Ala Thr Ser Pro Ala Asn Phe Ala Met
                115                 120                 125
Thr Asn Pro Val Val Met Gln Glu Ile Ala Arg Thr Gly Gly Met Asn
                130                 135                 140
Leu Ile Gln Gly Ala Gln Asn Leu Leu Lys Asp Ala Gln Ser Gly Arg
145                 150                 155                 160
Leu Thr Gln Val Pro Glu Asp Ala Phe Glu Val Gly Lys Asp Leu Ala
                165                 170                 175
Ile Thr Pro Gly Lys Val Val Tyr Arg Asn Arg Leu Glu Leu Ile Gln
                180                 185                 190
Tyr Thr Pro Ala Thr Glu Thr Val His Glu Ile Pro Ile Leu Val Val
                195                 200                 205
Pro Pro Trp Ile Asn Lys Tyr Tyr Val Met Asp Met Gln Pro Glu Asn
                210                 215                 220
Ser Leu Phe Lys Tyr Leu Val Asp Ala Gly Phe Leu Phe Thr Ile Ser
225                 230                 235                 240
Trp Lys Asn Pro Asp Glu Thr Val Leu Asp Leu Glu Trp Asp Asp Tyr
                245                 250                 255
Leu Asp Leu Gly Thr Leu Glu Ala Leu Arg Met Val Lys Glu Ile Met
                260                 265                 270
Gly Val Glu Gln Val Asn Leu Val Gly Tyr Cys Leu Gly Ile Ile Ser
                275                 280                 285
Gln Val Thr Leu Ala Tyr Leu Ala Ala Thr Gly Asp Asp Ala Gln Ile
                290                 295                 300
Asn Ser Ala Thr Tyr Phe Thr Thr His Gln Asp Phe Ser Asp Ala Gly
305                 310                 315                 320
Glu Ile Ser Val Phe Ile Ser Arg Leu Asp Val Met Phe Leu Glu Met
                325                 330                 335
Lys Ile Ser Gly Gly Tyr Leu Asp Gly Arg Asn Leu Ala Ala Thr Phe
                340                 345                 350
Asn Met Leu Arg Ala Asn Asp Leu Leu Trp Asn Tyr Val Val His Asn
                355                 360                 365
Tyr Leu Leu Gly Gln Glu Pro Ala Ser Phe Asp Leu Leu Tyr Trp Asn
                370                 375                 380
Asn Asp Gly Thr Arg Val Pro Gly Lys Val His Ser Phe Leu Leu Arg
385                 390                 395                 400
Glu Phe Phe Leu Asp Asn Lys Leu Lys Glu Pro Glu Gly Ile Gln Val
                405                 410                 415
Lys Gly Val Gly Ile Asp Leu Gly Lys Ile Thr Thr Pro Thr Val Val
                420                 425                 430
```

Thr Ala Asp Arg Asp His Ile Val Pro Trp Arg Gly Ala Phe Leu Val
        435                 440                 445

Arg Gln Leu Gln Ser Gly Pro Val Arg Phe Ile Leu Ser Gly Gly Gly
    450                 455                 460

His Ile Ala Gly Val Ile Ser Pro Pro Thr Lys Asn Arg Gly Phe Trp
465                 470                 475                 480

Ile Asn Glu Glu Lys Asp Asp Ala Asp Ala Trp Leu Ala Gly Ala
                485                 490                 495

Thr Lys His Asp Gly Ser Trp Trp Val Asp Trp Ile Pro Trp Leu Glu
            500                 505                 510

Glu Arg Ser Gly Arg Arg Val Lys Pro Pro Thr Ala Ala Gly Ser Asp
            515                 520                 525

Glu Phe Lys Pro Leu Met Asp Ala Pro Gly Thr Tyr Val Leu Glu Lys
        530                 535                 540

<210> SEQ ID NO 2
<211> LENGTH: 285
<212> TYPE: PRT
<213> ORGANISM: Streptomyces sp.

<400> SEQUENCE: 2

Met Pro Ile Asp Ala Arg Ala Ala Leu Ala Ala Pro Arg Arg Ala
1               5                   10                  15

Glu Ile Ala Trp Asn His Lys Asp Val Gln Leu Tyr His Leu Gly Leu
                20                  25                  30

Gly Ala Gly Ile Pro Ala Thr Asp Pro Asp Glu Leu Arg Tyr Thr Leu
            35                  40                  45

Glu Ser Arg Leu Gln Val Leu Pro Ser Phe Ala Thr Val Ala Gly Ala
    50                  55                  60

Gly Thr Ala Ala Phe Gly Gly Met Gly Ala Asp Gly Ile Asp Val Asp
65                  70                  75                  80

Leu Ala Ala Val Leu His Gly Gly Gln Ser Val Arg Val His Arg Pro
                85                  90                  95

Ile Pro Val Thr Gly Arg Ala Val Gln Thr Ser Lys Val Ala Ala Val
                100                 105                 110

Tyr Asp Lys Gly Lys Ala Ala Val Ile Val Leu Arg Thr Glu Ala His
            115                 120                 125

Asp Asp Glu Gly Pro Leu Trp Thr Asn Asp Ala Gln Ile Phe Val Arg
    130                 135                 140

Gly Glu Gly Gly Phe Gly Gly Glu Arg Gly Pro Ala Asp Arg Leu Ala
145                 150                 155                 160

Leu Pro Asp Arg Ala Pro Asp Arg Thr Ala Glu Arg Pro Ile Arg Glu
                165                 170                 175

Asp Gln Ala Leu Leu Tyr Arg Leu Ser Gly Asp Trp Asn Pro Leu His
            180                 185                 190

Ala Asp Pro Ala Phe Ala Lys Leu Ala Gly Phe Asp Arg Pro Ile Leu
        195                 200                 205

His Gly Leu Cys Thr Tyr Gly Met Val Leu Lys Ala Val Thr Asp Thr
    210                 215                 220

Leu Leu Asp Gly Asp Val Ser Arg Ile Ala Ala Tyr Arg Thr Arg Phe
225                 230                 235                 240

Ala Gly Val Val Phe Pro Gly Glu Thr Leu Arg Ile Arg Met Trp Gln
                245                 250                 255

Val Gly Asp Gly Arg Val Gln Val Ala Val Thr Ala Ala Gly Arg Asp

-continued

```
                260                 265                 270
Asp Ala Pro Val Leu Ala Asp Thr Leu Val Glu His Ser
            275                 280                 285
```

POLYHYDROXYALKANOIC ACID AND METHOD FOR PRODUCING SAME

SEQUENCE LISTING

The instant application contains a Sequence Listing which has been submitted electronically in ASCII format and is hereby incorporated by reference in its entirety. Said ASCII copy, created on May 6, 2022, is named 19P0082WO_SEQUENCE_LISTING.txt and is 7 k bytes in size.

TECHNICAL FIELD

The present invention is a polyhydroxyalkanoate comprising a 3-hydroxybutanoate unit and a 3-hydroxyhexanoate unit, and a method for producing the same.

BACKGROUND ART

Synthetic resins are indispensable materials in all scenes of life and industrial fields and have been produced in a quantity of 300 million tons or more annually. In the future, the production is expected to expand further due to the increase in world population.

Organic polymers as the raw materials of synthetic resins are refined and synthesized from petroleum resources, and problems have emerged, such as depletion of petroleum resources in the future and treatment of used products (wastes).

Examples of the treatment of used products (wastes) include treating of used products by pelletization or the like and recycling and using the resultant as a resource, incineration, and landfill disposal; however, since the start of mass production of plastics, the quantity of wastes being recycled as a resource is merely 9%, and it is the current situation that a majority of the wastes is subjected to incineration or landfill disposal.

Since incineration discharges large quantities of $CO_2$, it is a very important issue that incineration affects global warming. Furthermore, also in the case of landfill disposal, since it is very difficult for petroleum-derived resins to be degraded, petroleum-derived resins remain in the soil for a long time period and continue to pollute the global environment. In particular, microplastic contamination in the oceans has recently become a problem. For example, when plastic wastes are pulverized by waves or ultraviolet radiation, the plastic wastes become "microplastics" having a length of 5 millimeters or less, and microplastics accumulate in the bodies of fishes. It is considered that after 50 years, the amount of plastic wastes in the sea will exceed the total weight of fishes, and there is an urgent need for the mankind to reduce plastic wastes.

One of the solutions to these problems is to use biodegradable biopolymers. Development of resin products using biopolymers such as polylactate (PLA), polyhydroxyalkanoates (PHAs), and cellulose has also been in progress; however, it has been reported that the only biopolymers that can be actually said to be "biodegradable" even in a marine environment are PHA and cellulose.

In regard to the development of polyhydroxyalkanoates, primarily the development of poly-3-hydroxybutanoate [P(3HB)] is underway. However, poly-3-hydroxybutanoate has problems with physical properties such as brittleness and hardness, and since production and purification incur costs, practical application is delayed.

In recent years, copolymers comprising 3-hydroxybutanoate and other hydroxyalkanoates as constituent units of the polyhydroxyalkanoate have been developed in order to improve the shortcomings of P(3HB). For example, the development of a copolymer of 3-hydroxybutanoate and 3-hydroxyvalerate (3HV) or a copolymer of 3-hydroxybutanoate and 3-hydroxyhexanoate (3Hx) is in progress. Particularly, a copolymer of 3-hydroxybutanoate and 3-hydroxyhexanoate P(3HB-co-3HHx) has a possibility that physical properties close to the physical properties of conventional petroleum resource-derived synthetic resins may be obtained, and therefore, active research and development is underway (for example, see Patent Documents 1 to 5). Furthermore, development in which it is attempted to improve physical properties by varying the composition ratio of PHB and PHH that constitute the copolymerized polymer, is also in progress (see, for example, Patent Documents 6 and 7). Furthermore, in Non-Patent Document 1, a method for producing a polyhydroxyalkanoate by using *Cupriavidus necator* in which mangrove metagenome-derived polyhydroxyalkanoate synthase gene has been introduced, is disclosed.

CITATION LIST

Patent Document

Patent Document 1: JP 09-508423 W
Patent Document 2: JP 2002-534981 W
Patent Document 3: JP 2006-045366 A
Patent Document 4: WO 2011/105379 A
Patent Document 5: KR 10-1720933 B
Patent Document 6: JP 2014-144553 A
Patent Document 7: JP 2013-510572 A

Non-Patent Document

Non-Patent Document 1: Choon Pin Foong et al., 'A novel and wide substrate specific polyhydroxyalkanoate (PHA) synthase from unculturable bacteria found in mangrove soil', Journal of Polymer Research, Dec. 18, 2017

SUMMARY OF INVENTION

Technical Problem

A copolymer of 3-hydroxybutanoate and 3-hydroxyhexanoate P(3HB-co-3HHx), which has been conventionally developed, has low fluidity when melted, and has an extremely poor processability. Therefore, it is the current situation that the copolymer has not yet been put into wide practical use.

Thus, it is an object of the present invention to provide a polyhydroxyalkanoate P(3HB-co-3HHx) comprising 3-hydroxybutanoate and 3-hydroxyhexanoate, the polyhydroxyalkanoate having high melt fluidity and excellent processability.

Solution to Problem

In order to solve the problems described above, the inventors of the present invention found that with regard to a polyhydroxyalkanoate comprising 3-hydroxybutanoate and 3-hydroxyhexanoate, when the polyhydroxyalkanoate is produced by using microorganisms, and thereby the content of 3-hydroxyhexanoate is increased, a polyhydroxyalkanoate having novel physical properties is obtained. Thus, the inventors completed the present invention.

That is, the present invention provides the following polyhydroxyalkanoate, a molded body thereof, and a method for producing the polyhydroxyalkanoate.

The polyhydroxyalkanoate of the present invention is a polyhydroxyalkanoate comprising a 3-hydroxybutanoate unit and a 3-hydroxyhexanoate unit, the polyhydroxyalkanoate having a melt flow rate at 160° C. and 2.16 kg/f of 2.5 g/10 minutes or more.

According to this feature, since the polyhydroxyalkanoate is a copolymer of 3-hydroxybutanoate and 3-hydroxyhexanoate having excellent melt fluidity and excellent processability, a polyhydroxyalkanoate having excellent biodegradability can be widely used for resin molding or the like.

Furthermore, according to an embodiment of the polyhydroxyalkanoate of the present invention, the polyhydroxyalkanoate includes 13.0 mol % or more of a 3-hydroxyhexanoate unit and has a weight average molecular weight of $3.0 \times 10^5$ to $8.0 \times 10^5$ g/mol.

According to this feature, a polyhydroxyalkanoate that can achieve both melt fluidity and the heat resistance or durability obtainable when produced into a resin molded body, can be provided.

Furthermore, according to an embodiment of the polyhydroxyalkanoate of the present invention, the decomposition temperature determined by a thermogravimetric analysis is 270° C. or more.

According to this feature, a polyhydroxyalkanoate having excellent heat resistance can be provided.

Furthermore, according to an embodiment of the polyhydroxyalkanoate of the present invention, the melting point determined by a DSC analysis is 70° C. or more.

According to this feature, a polyhydroxyalkanoate having excellent crystallinity at room temperature can be obtained.

A molded body of the present invention has a feature of including the polyhydroxyalkanoate of the present invention as described above.

According to this feature, since a molded body having excellent biodegradability can be obtained, marine pollution, the problem of microplastics, and the like can be solved. Furthermore, since a biodegradation treatment is made possible in waste disposal, effects of reducing incineration and thus reducing the loads on the environment are also provided.

In addition, according to an embodiment of the molded body of the present invention, the molded body is a film or a nonwoven fabric.

According to this feature, since a film or nonwoven fabric having excellent biodegradability can be obtained, marine pollution, the problem with microplastics, and the like can be solved. Furthermore, since a biodegradation treatment for waste disposal is enabled, effects of reducing incineration and reducing loads on the environment are also provided.

According to an embodiment of a method for producing a polyhydroxyalkanoate of the present invention includes the following steps:
  Step 1: a step of preparing a microorganism capable of producing a polyhydroxyalkanoate;
  Step 2: a step of growing the microorganism in a medium;
  Step 3: a step of causing an animal to ingest the grown microorganism; and
  Step 4: a step of collecting a polyhydroxyalkanoate from excrements of the animal.

According to this feature, since a polyhydroxyalkanoate having excellent melt processability can be provided, a raw material of a molded body having excellent biodegradability can be provided more efficiently.

Furthermore, according to an embodiment of the method of producing a polyhydroxyalkanoate of the present invention, the microorganism is a microorganism into which polyhydroxyalkanoate synthase gene has been introduced.

According to this feature, a polyhydroxyalkanoate having excellent melt processability can be provided more efficiently.

Furthermore, according to an embodiment of the method for producing a polyhydroxyalkanoate of the present invention, the polyhydroxyalkanoate synthase comprises an amino acid sequence set forth in SEQ ID NO:1, or an amino acid sequence set forth in SEQ ID NO:1 having one or more amino acids substituted, deleted, or added.

According to this feature, a polyhydroxyalkanoate having excellent melt processability can be provided more efficiently.

Further, according to an embodiment of the method for producing a polyhydroxyalkanoate of the present invention, the microorganism is *Cupriavidus necator*.

According to this feature, a polyhydroxyalkanoate having excellent melt processability can be provided more efficiently.

Furthermore, according to an embodiment of the method for producing a polyhydroxyalkanoate of the present invention, the medium includes palm kernel oil, fish oil, waste edible oil, or the like.

According to this feature, a polyhydroxyalkanoate having excellent melt processability can be provided more efficiently.

In addition, according to an embodiment of the method for producing a polyhydroxyalkanoate of the present invention, the animal is a beetle larva.

According to this feature, a polyhydroxyalkanoate having less impurities can be provided at lower cost.

Effect of the Invention

According to the present invention, a polyhydroxyalkanoate P(3HB-co-3HHx) comprising 3-hydroxybutanoate and 3-hydroxyhexanoate and having high melt fluidity and excellent processability can be provided at lower cost.

BRIEF DESCRIPTION OF DRAWINGS

FIG. 1 shows the amino acid sequence of polyhydroxyalkanoate synthase expressed by polyhydroxyalkanoate synthase gene that has been introduced into *Cupriavidus necator* of Examples;

FIG. 2 shows an exemplary amino acid sequence of enoyl-CoA hydratase expressed by enoyl-CoA hydratase gene that is to be introduced into a microorganism;

FIG. 3 is a diagram illustrating the state in which dried microorganisms including a polyhydroxyalkanoate are fed to mealworms;

FIGS. 6(A) and 6(B) are diagrams illustrating A nonwoven fabric obtained by using a polyhydroxyalkanoate (containing 20 mol % of 3HHx) of Examples, wherein FIG. 6(A)

is a photograph of the nonwoven fabric, and FIG. 6(B) is a SEM photograph of the nonwoven fabric.

DESCRIPTION OF EMBODIMENTS

Figure 4:
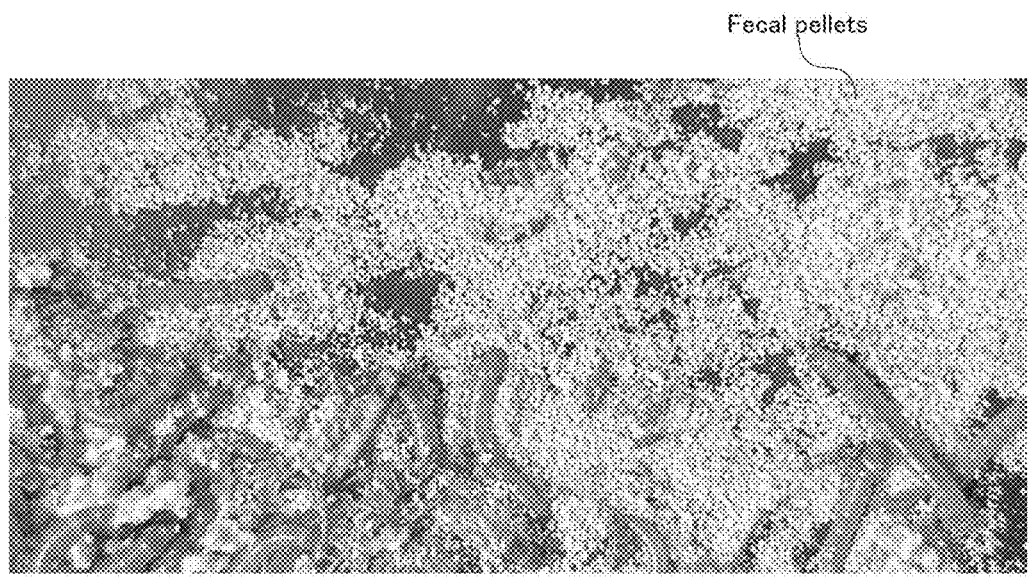
FIG. 4 is a diagram illustrating fecal pellets of mealworms that have ingested dried microorganisms including a polyhydroxyalkanoate.

Next, the present invention will be described, including best modes for carrying out the invention.

[Polyhydroxyalkanoate]

A polyhydroxyalkanoate is a biodegradable polymer represented by the following Chemical Formula (1):

[Chem. 1]

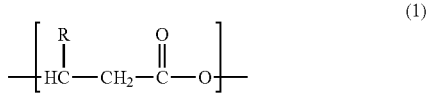
(1)

wherein R represents an alkylene group.

The polyhydroxyalkanoate of the present invention is a copolymer comprising a 3-hydroxybutanoate unit (3HB) represented by the following Chemical Formula (2) and a 3-hydroxyhexanoate unit (3HHx) represented by the following Chemical Formula (3):

[Chem. 2]

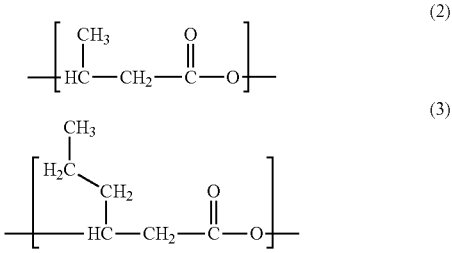
(2)

(3)

Furthermore, the polyhydroxyalkanoate of the present invention has a melt flow rate (MFR) at 160° C. and 2.16 kg/f of 2.5 g/10 minutes or more.

The lower limit of the MFR at 160° C. to and 2.16 kg/f is preferably 5.0 g/10 minutes or more, more preferably 10.0 g/10 minutes or more, even more preferably 20.0 g/10 minutes or more, and particularly preferably 25.0 g/10 minutes or more.

By adjusting the MFR at 160° C. and 2.16 kg/f to be 2.5 g/10 minutes or more, a polyhydroxyalkanoate having excellent melt fluidity and excellent processability can be obtained. Therefore, the polyhydroxyalkanoate can be widely used for resin molding or the like.

Measurement of the MFR in the present invention was carried out by a melt indexer method using a melt indexer apparatus (INDEXER 2A-C manufactured by Toyo Seiki Co., Ltd.).

Furthermore, according to an embodiment of the polyhydroxyalkanoate of the present invention, the melt flow rate (MFR) at 130° C. and 2.16 kg/f is 1.0 g/10 minutes or more.

The lower limit of the MFR at 130° C. and 2.16 kg/f is preferably 2.0 g/10 minutes or more, more preferably 6.0 g/10 minutes or more, even more preferably 8.0 g/10 minutes or more, and particularly preferably 25.0 g/10 minutes or more.

Furthermore, according to an embodiment of the polyhydroxyalkanoate of the present invention, the melt flow rate (MFR) at 140° C. and 2.16 kg/f is 1.5 g/10 minutes or more.

The lower limit of the MFR at 140° C. and 2.16 kg/f is preferably 4.0 g/10 minutes or more, more preferably 8.0 g/10 minutes or more, even more preferably 15.0 g/10 minutes or more, and particularly preferably 25.0 g/10 minutes or more.

Furthermore, according to an embodiment of the polyhydroxyalkanoate of the present invention, the melt flow rate (MFR) at 150° C. and 2.16 kg/f is 4.0 g/10 minutes or more.

The lower limit of the MFR at 150° C. and 2.16 kg/f is preferably 10.0 g/10 minutes or more, more preferably 15.0 g/10 minutes or more, even more preferably 20.0 g/10 minutes or more, and particularly preferably 25.0 g/10 minutes or more.

Furthermore, according to an embodiment of the polyhydroxyalkanoate of the present invention, the melt flow rate (MFR) at 170° C. and 2.16 kg/f is 5.0 g/10 minutes or more.

The lower limit of the MFR at 170° C. and 2.16 kg/f is preferably 10.0 g/10 minutes or more, more preferably 20.0 g/10 minutes or more, even more preferably 30.0 g/10 minutes or more, and particularly preferably 35.0 g/10 minutes or more.

Furthermore, according to an embodiment of the polyhydroxyalkanoate of the present invention, it is preferable that the polyhydroxyalkanoate includes the 3-hydroxyhexanoate unit represented by Chemical Formula (3) at a proportion of 13.0 mol % or more.

The lower limit of the content of the 3-hydroxyhexanoate unit is preferably 15.0 mol % or more, more preferably 20.0 mol % or more, and even more preferably 25.0 mol % or more. Meanwhile, the content of the 3-hydroxyhexanoate unit is calculated by $^1$H-NMR.

When the content of the 3-hydroxyhexanoate unit is adjusted to be in the range described above, the melt fluidity of the polyhydroxyalkanoate can be enhanced, and resin processability can be further enhanced.

Furthermore, according to an embodiment of the polyhydroxyalkanoate of the present invention, it is preferable that the weight average molecular weight is $3.0 \times 10^5$ to $8.0 \times 10^5$ g/mol. The upper limit of the weight average molecular weight is preferably $6.0 \times 10^5$ or less, more preferably $5.0 \times 10^5$ or less, and even more preferably $4.0 \times 10^5$ or less.

When the weight average molecular weight of the polyhydroxyalkanoate of the present invention is adjusted to be in the range described above, a polyhydroxyalkanoate that can achieve both melt fluidity and the heat resistant or durability obtainable when produced into a resin molded body, can be obtained.

Furthermore, according to an embodiment of the polyhydroxyalkanoate of the present invention, it is preferable that the number average molecular weight is $2.0 \times 10^5$ to $4.0 \times 10^5$ g/mol. The upper limit of the number average molecular weight is $3.5 \times 10^5$ or less, and more preferably $3.0 \times 10^5$ or less.

Furthermore, according to an embodiment of the polyhydroxyalkanoate of the present invention, it is preferable that the molecular weight distribution is 1 to 20. The lower limit of the molecular weight distribution is preferably 2 or greater, more preferably 5 or greater, and even more preferably 7 or greater. The upper limit is preferably 15 or less, and more preferably 10 or less.

When the molecular weight distribution of the polyhydroxyalkanoate of the present invention is adjusted to be in the range described above, a polyhydroxyalkanoate having uniform product quality can be obtained.

Furthermore, in the present invention, regarding the measurement of the molecular weight and the molecular weight distribution, measurement was made using a GPC analyzer (Agilent 1200 series GPC equipped with a Shodex K-806M column).

Furthermore, according to an embodiment of the polyhydroxyalkanoate of the present invention, it is preferable that the decomposition temperature determined in a thermogravimetric analysis is 270° C. or more. The lower limit is preferably 275° C. or more, and more preferably 280° C. or more. When the decomposition temperature determined by a thermogravimetric analysis is 270° C. or more, a polyhydroxyalkanoate having excellent heat resistance can be obtained.

Furthermore, according to an embodiment of the polyhydroxyalkanoate of the present invention, it is preferable that the melting point determined by a DSC analysis is 70° C. or more. The lower limit is preferably 100° C. or more, and more preferably 110° C. or more. When the melting point determined by a DSC analysis is 70° C. or more, a polyhydroxyalkanoate having excellent crystallinity at room temperature can be obtained.

[Resin Composition Including Polyhydroxyalkanoate]

The polyhydroxyalkanoate of the present invention can be mixed with other additives, as long as the performance of the polyhydroxyalkanoate is not deteriorated, and can be produced into a resin composition. Regarding the other additives, a resin other than the polyhydroxyalkanoate of the present invention, an oxidation inhibitor, an ultraviolet absorber, a plasticizer, a flame retardant, an inorganic filler, a nucleating agent, and the like can be used.

The other resin composition may be a thermoplastic resin, a thermosetting resin, or the like, and examples include polyolefin-based resins such as polyethylene and polypropylene; polyimide, polyamide, polyphenylene ether polyether ketone, polyether ketone ketone, polybutadiene, polystyrene, polyester, polylactate, a phenolic resin, poly(meth)acrylate, and a norbornene-based resin.

[Molded Body Containing Polyhydroxyalkanoate]

It is preferable that the polyhydroxyalkanoate of the present invention is used as a molded body. The form of the molded body is not particularly limited; however, examples include a fiber, a yarn, a film, a sheet, a nonwoven fabric, and a straw. It is more preferable to produce the polyhydroxyalkanoate into a film or a nonwoven fabric. Furthermore, the molded body containing the polyhydroxyalkanoate of the present invention is acceptable as long as it contains a polyhydroxyalkanoate, and the molded body may also be a molded body containing the above-mentioned resin composition obtained by incorporating additives into a polyhydroxyalkanoate.

The method for molding the polyhydroxyalkanoate of the present invention into a film is not particularly limited; however, examples include T-die extrusion molding, calender molding, roll molding, and inflation molding. The molding temperature employed at the time of film molding is not particularly limited; however, the molding temperature is 130° C. to 190° C.

The method for molding the polyhydroxyalkanoate of the present invention into a nonwoven fabric is not particularly limited; however, the molding method may be an electrospray deposition (ESD) method, a melt blowing method, or another method for producing a nonwoven fabric. An ESD method or a melt blowing method is more preferred.

In the melt blown method, the temperature for melting the polyhydroxyalkanoate of the present invention is preferably from 80° C. to 250° C. The lower limit of the temperature of the nozzle block is more preferably 120° C. or more, further preferably 150° C. or more, and particularly preferably 170° C. or more. The upper limit of the temperature of the nozzle block is more preferably 210° C. or less, further preferably 200° C. or less, and particularly preferably 190° C. or less.

In the melt blown method, the temperature of the nozzle block for fiberizing the polyhydroxyalkanoate of the present invention is preferably from 80° C. to 250° C. The lower limit of the temperature of the nozzle block is more preferably 120° C. or more, further preferably 150° C. or more, and particularly preferably 180° C. or more. The upper limit of the temperature of the nozzle block is more preferably 220° C. or less, further preferably 210° C. or less, and particularly preferably 200° C. or less. Meanwhile, When the temperature of the nozzle block is out of the above range, the polyhydroxyalkanoate of the present invention cannot be fiberized.

In the melt blown method, the temperature of the hot air is preferably 100° C. or more and 250° C. or less. The lower limit of the temperature of the hot air is more preferably 150° C. or more, further preferably 180° C. or more, and particularly preferably 190° C. or more. The upper limit of the temperature of the nozzle block is more preferably 230° C. or less, further preferably 220° C. or less, and particularly preferably 210° C. or less.

By setting the melting temperature, the temperature of the nozzle block, the temperature of the hot air, and the residence time in the melt blown method within the above ranges, a good fiber state is obtained, and the fiber is suitable for producing a nonwoven fabric.

When fiberizing the polyhydroxyalkanoate of the present invention, the content of the 3-hydroxyhexanoic acid unit is preferably from 13.0 mol % to 30.0 mol %. The lower limit is more preferably 15.0 mol % or more. The upper limit is more preferably 25 mol % or less. By setting the content in this range, a good fiber state is obtained, and the fiber is suitable for producing a nonwoven fabric.

[Method for Producing Polyhydroxyalkanoate]

The method for producing a polyhydroxyalkanoate of the present invention may be any production method as long as a polyhydroxyalkanoate having a melt flow rate (MFR) at 160° C. and 2.16 kg/f of 2.5 g/10 minutes or more is obtained.

For example, according to an embodiment of the method for producing a polyhydroxyalkanoate of the present invention, the method includes the following steps.

Step 1: a step of preparing a microorganism capable of producing a polyhydroxyalkanoate;
Step 2: a step of growing the microorganism in a medium;
Step 3: a step of causing an animal to ingest the grown microorganism; and
Step 4: a step of collecting a polyhydroxyalkanoate from excrements of the animal.

It is preferable that the polyhydroxyalkanoate of the present invention is produced using a microorganism. Examples of the microorganism include microorganisms having a polyhydroxyalkanoate production ability, such as *Bacillus megaterium*, *Cupriavidus necator*, and *Alcaligenes latus*. *Cupriavidus necator* is particularly preferred.

The microorganism is preferably a microorganism in which a gene participating in the synthesis of a polyhydroxyalkanoate has been deleted or introduced. For example, it is preferable to use a microorganism in which acetoacetyl-CoA reductase gene has been deleted. Furthermore, it is preferable to introduce hydroxyalkanoate synthase gene or enoyl-CoA hydratase gene. Thereby, the content of the 3-hydroxyhexanoate unit included in the polyhydroxyalkanoate can be increased.

An example of hydroxyalkanoate synthase that is expressed by hydroxyalkanoate synthase gene comprises, for example, an amino acid sequence set forth in SEQ ID NO:1 shown in FIG. 1, or an amino acid sequence set forth in SEQ ID NO:1 having one or more amino acids substituted, deleted, or added.

Furthermore, an example of enoyl-CoA hydratase that is expressed by enoyl-CoA hydratase gene comprises, for example, an amino acid sequence set forth in SEQ ID NO:2 shown in FIG. 2, or an amino acid sequence set forth in SEQ ID NO:2 having one or more amino acids substituted, deleted, or added.

By using a microorganism in which a gene expressing the hydroxyalkanoate synthase set forth SEQ ID NO:1 and/or the enoyl-CoA hydratase set forth in SEQ ID NO:2 has been introduced, a polyhydroxyalkanoate P(3HB-co-3HHx) comprising 3-hydroxybutanoate and 3-hydroxyhexanoate, which has high melt fluidity and excellent processability, can be produced.

The medium used for the culture of the microorganism is not particularly limited as long as a microorganism grows therein. For example, the medium is a medium including, as a carbon source, an alcohol such as methanol, ethanol, or butanol; a fatty acid, such as a saturated or unsaturated fatty acid such as acetic acid, propionic acid, hexanoic acid, octanoic acid, decanoic acid, lauric acid, oleic acid, palmitic acid, linoleic acid, linolenic acid, or myristic acid; a sugar such as glucose or fructose; an organic acid such as lactic acid; or oils and fats including a large quantity of saturated/unsaturated fatty acids having 10 or more carbon atoms. Examples of the oils and fats include plant oils and fats such as coconut oil, palm kernel oil, palm oil, palm olein, jatropha oil, rapeseed oil, soybean oil, rice oil, and sesame oil; animal oils and fats such as lard and beef tallow; and fish oil. Incidentally, for the oils and fats, products before purification, waste edible oil, and the like can also be used. Regarding the oils and fats to be added as carbon sources into a medium, palm kernel oil or coconut oil, both of which contain lauric acid, is preferred. When palm kernel oil or coconut oil is incorporated, the 3HHx content of the polyhydroxyalkanoate can be increased.

It is preferable that the production conditions for the polyhydroxyalkanoate of the present invention are aerobic conditions. If necessary, a nitrogen source or an inorganic substance may also be added. Examples of the nitrogen source include ammonia, and ammonium salts such as ammonium chloride, ammonium sulfate, and ammonium phosphate. Examples of the inorganic substance include potassium monobasic phosphate, potassium dibasic phosphate, magnesium phosphate, magnesium sulfate, and sodium chloride.

The culturing temperature is preferably 20° C. to 40° C., and more preferably 25° C. to 35° C. The culturing time is not particularly limited; however, the culturing time is preferably 48 to 72 hours.

In regard to the method for producing a polyhydroxyalkanoate of the present invention, the content of 3HHx can be controlled by controlling the amounts of expression of the acetoacetyl-CoA reductase gene and enoyl-CoA hydratase gene.

The content of 3HHx can also be controlled by controlling the residual amount of the carbon source, adjusting the inorganic component concentration in the culture fluid, and adjusting the airflow quantity of oxygen and the culturing time.

The purification method for the polyhydroxyalkanoate of the present invention is not particularly limited; however, a method of collecting the polyhydroxyalkanoate from the medium by centrifugation and performing extraction using a solvent or the like; or a method of causing an animal to digest and absorb the microorganism and collecting the polyhydroxyalkanoate as excrements, may be employed. From the viewpoint that the concentration of the polyhydroxyalkanoate can be easily concentrated, a method of causing an animal to digest and absorb a microorganism, and collecting the polyhydroxyalkanoate as granular polyhydroxyalkanoate included in the excrements, is preferred.

Examples of the animal include animals such as a rodent, goat, sheep, cow, and a bird; aquatic organisms; beetles; and insects. A beetle larva such as mealworm is preferred, and a 35-day old larva of *Tenebrio molitor* is more preferred.

After the microorganism is fed to larvae such as mealworms, fecal pellets are collected and sieved using a screen. Subsequently, the fecal pellets are washed with water and a base such as sodium hydroxide, and are dried. Thereby, the polyhydroxyalkanoate of the present invention can be collected.

EXAMPLES

Hereinafter, the present invention will be specifically described by way of Examples; however, the technical scope of the present invention is not intended to be limited by these Examples.

Example 1

Production of Polyhydroxyalkanoate Comprising 3-Hydroxybutanoate Unit (3HB) and 3-Hydroxyhexanoate Unit (3HHx)

Preparation of Mineral Medium for Production of P(3HB-co-3HHx)

A mineral medium for the production of P(3HB-co-3HHx) was formed from 4.0 g/L of $NaH_2PO_4$, 4.6 g/L of $Na_2HPO_4$, 0.45 g/L of $K_2SO_4$, 0.39 g/L of $MgSO_4$, 62 mg/L of $CaCl_2$), and 1 mL/L of a trace element solution (a trace element solution includes 15 g/L of $FeSO_4 \cdot 7H_2O$, 2.4 g/L of $MnSO_4H_2O$, 2.4 g/L of $ZnSO_4 \cdot 7H_2O$, and 0.48 g/L of $CuSO_4 \cdot 5H_2O$ dissolved in 0.1 M HCl), and the medium was adjusted to pH 7.0 before being sterilized by an autoclave.

Biosynthesis of P(3HB-co-3HHx) Using 13-L Fermentation Tank

Biosynthesis of P(3HB-co-3HHx) was carried out using *Cupriavidus necator* having polyhydroxyalkanoate synthase gene introduced therein.

First, *Cupriavidus necator* in which a gene encoding polyhydroxyalkanoate synthase as set forth in SEQ ID NO:1 had been introduced was streaked on an agar plate and was cultured for 24 hours at 30° C. Next, as pre-culture, the *Cupriavidus necator* was inoculated two times into 50 mL of culture fluid using a platinum loop, and the culture system was shaken in an incubator shaker at 30° C. for 8 hours until the OD600 nm of the culture fluid reached 4. To 100 mL of the mineral medium in which 0.54 g/L of urea, 0.39 g/L of $MgSO_4$, 62 mg/L of $CaCl_2$, 1 mL/L of the trace element solution, and 1% by mass of crude palm kernel oil had been added, about 3 mL of the culture fluid was inoculated. The crude palm kernel oil was subjected to an autoclave treatment before being added to the mineral medium. Furthermore, this mineral medium was cultured for 18 hours and then was inoculated into a 6-L fermentation tank. The form of the *Cupriavidus necator* thus inoculated was checked before being transferred into the fermentation tank (10% v/v). While the temperature of the culture medium was maintained at 30° C., the pH of the medium was set to 7.0±0.1 by addition of 3 M NaOH and 3 M $H_3PO_4$. Stirring was carried out at a stirring rate of 200 to 900 rpm using a Rushton turbine. Air was supplied at a volume of 1 vvm (air volume/working volume of fermenter/minute) through a filter cartridge (Sartorius Stedim, Germany), and the dissolved oxygen concentration was maintained at or above 40%. $MgSO_4·7H_2O$ was added on the 18th hour after culture, and urea was added every 6 hours. Trace elements were added in an amount of 1 mL between planting and on the 18th hour of culture. Crude palm kernel was supplied at a concentration of 10 g/L to 20 g/L every 6 hours according to the consumption of the oil by the microorganism. In order to determine the residual oil content, wetted cell weight, and optical density of the bacterial culture, sampling was performed every 6 hours. The culturing time was in the range of from 48 hours to 72 hours according to the growth of the bacterial cells.

Biological Collection of P(3HB-co-3HHx)

35-day old mealworms (larvae of *Tenebrio molitor*) were reared in a plastic container at ambient temperature (about 25° C.). 100 g of the reared mealworms were fed with the dried microorganisms including P(3HB-co-3HHx) (FIG. 3). The amount of the microorganisms thus fed was supplied based on the body weight of the mealworms (5% per day of the body weight). Before a new batch of microorganisms was supplied, fecal pellets (FIG. 4) of the mealworms were collected and sieved using screens having a mesh size of 0.50 mm and 0.25 mm. By performing double sieving, other impurities were eliminated, and the subsequent washing process could be made easier.

Purification of P(3HB-co-3HHx) Using Distilled Water

About 10% (w/v) of the fecal pellets were added to tap water to a concentration of 100 g/L. The fecal pellet suspension was rinsed several times and was settled before the supernatant was discarded. The supernatant was removed, and the P(3HB-co-3HHx) thus collected was dried in an oven at 50° C. until a constant mass was obtained.

Furthermore, the P(3HB-co-3HHx) thus dried was rinsed for one hour in 0.25 M NaOH, the mixture was settled, and the supernatant was removed. The pellets thus collected were stirred for another one hour in tap water until the pH decreased to a value less than 9.5. Subsequently, granules of P(3HB-co-3HHx) thus collected were dried in an oven at 50° C. until a constant mass was obtained, and thus, the intended P(3HB-co-3HHx) was collected.

Examples 2 to 5

In Examples 2 to 5, P(3HB-co-3HHx) was produced using the microorganisms and media described in the following Table 1, and P(3HB-co-3HHx) was collected by the purification method described in Table 1.

Measurement of Average Molecular Weight and Molecular Weight Distribution

Measurement of the average molecular weight (number average molecular weight (Mn) and weight average molecular weight (Mw)) was carried out for the polyhydroxyalkanoate obtained as described above, and the molecular weight distribution D (Mw/Mn) was calculated.

The measurement of the average molecular weight was carried out using a GPC analyzer (Agilent 1200 series GPC equipped with a Shodex K-806M column). A polymer sample was dissolved in chloroform at a concentration of 1.0 mg/mL. Chloroform was used as the eluent, and the flow rate was set to 0.8 mL/min. Furthermore, the injection amount of the polymer sample was set to 50 μL. Regarding the standard samples, polystyrene standards were used.

TABLE 1

| | Microorganism | Introduced gene (Hydroxyalkanoate synthase) | Medium | Purification method | 3HHx content (mol %) | Mn ($\square 10^5$)g/mol | Mw ($\square 10^5$)g/mol | D (Mn/Mw) |
|---|---|---|---|---|---|---|---|---|
| Example 1 | *C. necator* | SEQ ID NO: 1 | Crude palm kernel oil added | Biological collection (mealworms) | 13.7 | 3.8 | 7.9 | 2.1 |
| Example 2 | *C. necator* | *Rhodococcus aetherivorans*-derived | No crude palm kernel oil added | Biological collection (mealworms) | 20 | 2.5 | 3.6 | 1.4 |
| Example 3 | *C. necator* | *Rhodococcus aetherivorans*-derived | No crude palm kernel oil added | Chloroform extraction | 20 | 2.3 | 3.7 | 1.5 |
| Example 4 | *C. necator* | *Rhodococcus aetherivorans*-derived | Crude palm kernel oil added | Biological collection (mealworms) | 30 | 2.2 | 3.2 | 1.4 |
| Example 5 | *C. necator* | *Rhodococcus aetherivorans*-derived | Crude palm kernel oil added | Chloroform extraction | 30 | 2.7 | 3.8 | 1.4 |

Measurement of Decomposition Temperature

For the polyhydroxyalkanoates obtained as described above, measurement of the decomposition temperature was carried out.

Measurement of the decomposition temperature was carried out by a differential thermal-thermogravimetric simultaneous analysis (TG-DTA) method using a differential thermal balance apparatus (TG-DTA 8122 manufactured by Rigaku Corporation). Regarding the measurement conditions, temperature was raised from room temperature to 300° C. in air at a rate of 5° C. per minute, and measurement was made.

For all of the samples of Examples 1 to 5, the decomposition temperature was 270° C. to 280° C., and there was no correlation between the percentage content of 3HHx and the decomposition temperature.

Measurement of Melting Temperature

For the polyhydroxyalkanoates obtained as described above, measurement of the melting temperature was carried out.

Measurement of the melting temperature was carried out by a differential scanning calorimetry (DSC) method using a differential scanning calorimetric analyzer (DSCvesta manufactured by Rigaku Corporation). Regarding the measurement conditions, temperature was raised from room temperature to 230° C. in air at a rate of 5° C. per minute (1st). Subsequently, temperature was lowered to room temperature at a rate of 20° C. per minute, the temperature was maintained constant at room temperature for 24 hours, and then the temperature was raised again to 230° C. at a rate of 5° C. per minute (2nd). Then, measurement was performed. The melting temperatures were 116.3° C. (Example 1), 104.7° C. (Example 2), and 71.5° C. (Example 4), respectively, and it was found that as the proportion of 3HHx is higher, the melting temperature tends to be lower.

Measurement of Melt Flow Rate

For the polyhydroxyalkanoates obtained as described above, measurement of the melt flow rate was carried out. Measurement was carried out by a melt indexer method using a melt indexer apparatus (INDEXER 2A-C manufactured by Toyo Seiki Co., Ltd.) as a measuring apparatus. The weight used was 1,835 g, the sample was 5 g, the preheating time was 330 seconds, the holding time was 30 seconds, the cut time (t) of one round was 20 seconds, and the weight (m) of a cutoff piece was an average value of the weights of three cutoff pieces. The results thus obtained were substituted into the following Mathematical Formula (1), and thus the melt flow rate (MFR) was obtained. The results are presented in Table 2.

[Math. 1]

$$MFR\ (\text{g}/10\ \text{min}) = \frac{600 \times m}{t} \qquad \text{mathmatical formula (1)}$$

TABLE 2

|  | Example 1 | Example 2 | Example 4 |
|---|---|---|---|
| 3HHx content (mol %) | 13.7 | 20 | 30 |
| Measurement temperature (□ C.) 110 | N.D | 1.74 | N.D |
| 120 | N.D | 3.48 | 53.1 |
| 130 | 1.11 | 7.68 | 97.8 |
| 140 | 1.95 | 10.26 | 181.2 |
| 150 | 4.14 | 16.05 | 286.5 |
| 160 | 9.51 | 23.91 | Liquid |
| 170 | 33.42 | Liquid | Liquid |

From the results of Table 2, it was found that as the percentage content of 3HHx increased, the melt flow rate increased. Furthermore, the polyhydroxyalkanoate having a percentage content of 3HHx of 20 mol % had the widest processing-possible temperature range, and an enhancement of the processing environment can be further expected.

Production of Film

Figure 5:
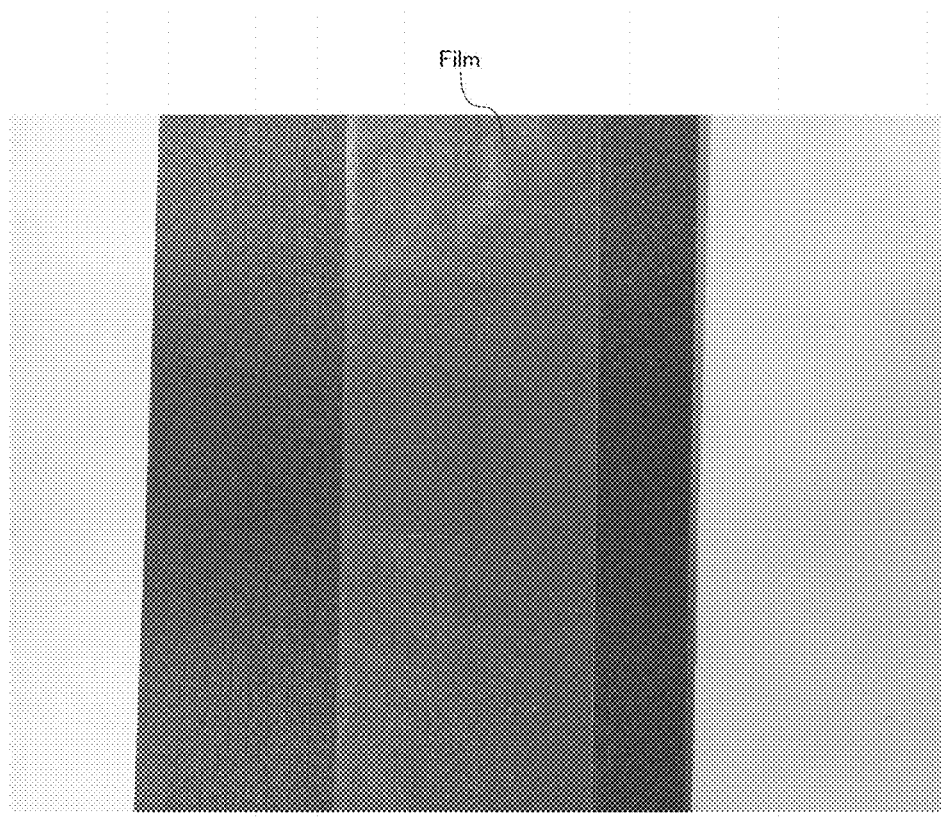
FIG. 5 is a diagram illustrating a film obtained by using a polyhydroxyalkanoate (containing 30 mol % of 3HHx) of Examples.

A film was produced using the polyhydroxyalkanoate of Example 4 (containing 30 mol % of 3HHx) obtained as described above (FIG. 5).

Regarding the method for producing the film, molding was carried out under the following conditions using a T-die extrusion sheet molding machine (manufactured by Research Laboratory of Plastics Technology Co., Ltd.).

| Molding temperature | 120° C. |
|---|---|
| Roll setting temperature | 30° C. |
| Speed of screw rotation | 20 rpm |
| Drawing speed | 0.3 m/min |

The molded film exhibited fairly strong adhesiveness immediately after molding; however, after a short time, the film became a self-supporting film. The melting temperature of this film was measured under the same conditions as those employed for the measurement of melting temperature described above, and the melting temperature was 101.1° C. From these results, it was found that the melting temperature became higher by about 30° C. compared to that before processing.

Production of Nonwoven Fabric

A nonwoven fabric was produced using the polyhydroxyalkanoate of Example 2 (containing 20 mol % of 3HHx) obtained as described above (FIG. 6). FIG. 6(A) is a photograph of the nonwoven fabric, and FIG. 6(B) is a SEM photograph of the nonwoven fabric.

The non-woven fabric was prepared using a small melt blow tester "MB-T100SW" (manufactured by Shinwa Kogyo Co., Ltd.) under the following conditions.

Polymer piping temperature: 185° C.
Nozzle block temperature: 195° C.
Hot air temperature: 200° C.
Air volume: 633 L/min

INDUSTRIAL APPLICABILITY

The polyhydroxyalkanoate of the present invention has high melt fluidity and excellent processability, and therefore, production of a molded body such as a film or a nonwoven fabric can be carried out easily.

The invention claimed is:

1. A polyhydroxyalkanoate, comprising a 3-hydroxybutanoate unit and a 3-hydroxyhexanoate unit,
wherein the polyhydroxyalkanoate includes 20.0 mol % or more and 30.0 mol % or less of a 3-hydroxyhexanoate unit and has a weight average molecular weight of $3.0 \times 10^5$ to $4.0 \times 10^5$ g/mol, and a number average molecular weight of $3.5 \times 10^5$ g/mol or less, and
the polyhydroxyalkanoate has a melt flow rate
at 130° C. and 2.16 kg/f of 6.0 g/10 minutes or more,
at 140° C. and 2.16 kg/f of 8.0 g/10 minutes or more,
at 150° C. and 2.16 kg/f of 10.0 g/10 minutes or more, and
at 160° C. and 2.16 kg/f of 10.0 g/10 minutes or more, and
the polyhydroxyalkanoate is not a liquid when the polyhydroxyalkanoate has the melt flow rate at 160 C and 2.16 kg/f of 10.0 g/10 minutes or more.

2. The polyhydroxyalkanoate according to claim 1, wherein the polyhydroxyalkanoate has a decomposition temperature of 270° C. or more as determined by a thermogravimetric analysis.

3. The polyhydroxyalkanoate according to claim 1, wherein the polyhydroxyalkanoate has a melting point of 70° C. or more as determined by a DSC analysis.

4. A molded body, comprising the polyhydroxyalkanoate according to claim 1.

5. The molded body according to claim 4, wherein the molded body is a film or a nonwoven fabric.

6. A method for producing a polyhydroxyalkanoate of claim 1, the method comprising the following steps:
Step 1: a step of preparing a microorganism capable of producing a polyhydroxyalkanoate;
Step 2: a step of growing the microorganism in a medium;
Step 3: a step of causing an animal to ingest the grown microorganism; and
Step 4: a step of collecting the polyhydroxyalkanoate from excrements of the animal.

7. The method for producing a polyhydroxyalkanoate according to claim 6, wherein the microorganism is a microorganism having polyhydroxyalkanoate synthase gene introduced therein.

8. The method for producing a polyhydroxyalkanoate according to claim 7, wherein the polyhydroxyalkanoate synthase comprises an amino acid sequence set forth in SEQ ID NO:1, or an amino acid sequence set forth in SEQ ID NO:1 having one or more amino acids substituted, deleted, or added.

9. The method for producing a polyhydroxyalkanoate according to claim 6, wherein the microorganism is *Cupriavidus necator*.

10. The method for producing a polyhydroxyalkanoate according to claim 6, wherein the medium includes palm kernel oil, fish oil, or waste edible oil.

11. The method for producing a polyhydroxyalkanoate according to claim 6, wherein the animal is a beetle larva.

\* \* \* \* \*